US008915128B2

(12) United States Patent
Tucker (10) Patent No.: US 8,915,128 B2
(45) Date of Patent: Dec. 23, 2014

(54) BRAKE TOOLS FOR INSPECTING A BRAKE SHOE, AND RELATED METHODS

(75) Inventor: Lawrence W. Tucker, Baltimore, MD (US)

(73) Assignee: CRW Parts, Inc., Baltimore, MD (US)

( * ) Notice: Subject to any disclaimer, the term of this patent is extended or adjusted under 35 U.S.C. 154(b) by 107 days.

(21) Appl. No.: 13/369,802

(22) Filed: Feb. 9, 2012

(65) Prior Publication Data

US 2012/0204631 A1   Aug. 16, 2012

Related U.S. Application Data

(60) Provisional application No. 61/457,253, filed on Feb. 10, 2011.

(51) Int. Cl.
| | | |
|---|---|---|
| *G01M 17/00* | (2006.01) | |
| *B60T 17/22* | (2006.01) | |
| *F16D 65/08* | (2006.01) | |
| *B25B 27/00* | (2006.01) | |
| *F16D 65/00* | (2006.01) | |

(52) U.S. Cl.
CPC .............. *B60T 17/221* (2013.01); *F16D 65/08* (2013.01); *B25B 27/0035* (2013.01); *F16D 65/0043* (2013.01)
USPC .......................................................... 73/121

(58) Field of Classification Search
USPC .................... 73/121, 128, 129, 130, 131, 132
See application file for complete search history.

(56) References Cited

U.S. PATENT DOCUMENTS

| | | | |
|---|---|---|---|
| 3,136,390 A | | 6/1964 | Zukowski |
| 3,703,826 A | * | 11/1972 | Burke .............................. 73/121 |
| 3,896,686 A | * | 7/1975 | Swinney ......................... 81/484 |
| D253,048 S | | 10/1979 | Morgan |
| D253,279 S | | 10/1979 | Morgan |
| D253,280 S | * | 10/1979 | Morgan ......................... D10/64 |
| 4,353,442 A | | 10/1982 | Correa |
| 5,181,440 A | * | 1/1993 | Jagt ................................ 81/484 |
| 5,528,809 A | | 6/1996 | Green et al. |
| 5,887,687 A | | 3/1999 | Williams |
| 6,442,817 B1 | | 9/2002 | Swanson |
| 7,328,607 B2 | * | 2/2008 | Pfeffer ............................ 73/129 |
| 2005/0109090 A1 | * | 5/2005 | Pfeffer ............................ 73/121 |

OTHER PUBLICATIONS

International Search Report issued in related International Patent Application No. PCT/US2012/024542 on Sep. 24, 2012.
Written Opinion issued in related International Patent Application No. PCT/US2012/024542 on Sep. 24, 2012.

* cited by examiner

*Primary Examiner* — Eric S McCall
(74) *Attorney, Agent, or Firm* — Venable LLP; Steven J. Schwarz (57) ABSTRACT

A brake tool for inspecting a brake shoe having an anchor end and a cam end includes a first portion adapted to engage with an anchor aperture in the anchor end of the brake shoe, the first portion defining a first portion axis and having a length along the first portion axis sufficient to engage substantially an entire width of the anchor aperture; a second portion adapted to engage with a cam aperture in the cam end of the brake shoe, the second portion defining a second portion axis and having a length along the second portion axis sufficient to engage substantially an entire width of the cam aperture; and a connecting member connecting the first portion and the second portion with the first portion axis and the second portion axis substantially parallel to one another.

18 Claims, 11 Drawing Sheets

BRAKE TOOLS FOR INSPECTING A BRAKE SHOE, AND RELATED METHODS

CROSS-REFERENCE TO RELATED APPLICATIONS

This application claims priority under 35 U.S.C. Section 119 to U.S. Provisional Application No. 61/457,253 filed on Feb. 10, 2011, the entire contents of which are incorporated herein by reference.

BACKGROUND

1. Technical Field

The present application relates generally to tools and related methods for inspecting and preparing brake shoes, such as new, used, and reconditioned brake shoes.

2. Background

Brake shoes for drum brakes typically include a core including web and table portions, and a brake lining located on the table. The web can include an anchor end that anchors the brake shoe to the brake, and a cam end that is acted on to engage the brake. Typically, an aperture, such as a bore, groove, or notch, is located in both the anchor end and the cam end. It is desirable for proper operation of the brake that the aperture located in the anchor end is properly aligned with the aperture located in the cam end. After extended periods of use, the brake shoes may become stretched, torqued, or otherwise deformed, causing the distance between the apertures to stretch beyond the manufacturer's specifications, or causing the apertures to become misaligned or twisted with respect to one another.

In addition, when preparing brake shoes for use, it is often necessary to insert a bushing into an aperture, such as the aperture in the anchor end of the brake shoe. The bushings need to be properly aligned and positioned in the brake shoe for proper operation. Also, care should be taken to avoid deformation of any portion of the core, such as the web surrounding the anchor aperture, during installation of the bushing.

SUMMARY

An embodiment of the present invention relates to a brake tool for inspecting a brake shoe having an anchor end and a cam end. The brake tool can comprise a first portion adapted to engage with an anchor aperture in the anchor end of the brake shoe, the first portion defining a first portion axis and having a length along the first portion axis sufficient to engage substantially an entire width of the anchor aperture; a second portion adapted to engage with a cam aperture in the cam end of the brake shoe, the second portion defining a second portion axis and having a length along the second portion axis sufficient to engage substantially an entire width of the cam aperture; and a connecting member connecting the first portion and the second portion with the first portion axis and the second portion axis substantially parallel to one another.

According to another embodiment, a bushing installation tool for a brake shoe can comprise a first section that is substantially cylindrical and defines a first diameter substantially equal to an inner diameter of a bushing, and a length equal to or less than a length of the bushing; a second section connected to the first section, wherein the second section is substantially cylindrical and defines a second diameter greater than the first diameter; and a stop connected to the second section, wherein the stop is positioned to engage a portion of a brake shoe to prevent the first section from extending into an aperture in the brake shoe beyond a predefined depth.

According to another embodiment, a brake support tool for a brake shoe can comprise a first support surface adapted to support a first web located at an anchor end of the brake shoe, and a second support surface adapted to support a second web located at the anchor end of the brake shoe, wherein the first support surface and the second support surface are separated by a predetermined distance.

The present invention also relates to a method of inspecting a brake shoe having an anchor end and a cam end. The method can comprise inserting a first portion of a brake tool into an anchor aperture in the anchor end of the brake shoe; and determining whether a second portion of the brake tool extends into and engages substantially an entire width of a cam aperture in the cam end of the brake shoe, indicating that the anchor aperture and the cam aperture of the brake shoe are substantially parallel, and are spaced apart by a predetermined distance.

According to another embodiment, a method of installing a bushing into an anchor end of a brake shoe can comprise mounting the bushing on a first portion of a bushing installation tool; locating the bushing over an anchor aperture in the anchor end of the brake shoe; and pressing the bushing into the anchor aperture along an axis of the anchor aperture, until a stop portion of the bushing installation tool engages a portion of the brake shoe and prevents further movement of the bushing installation tool along the axis of the anchor aperture.

According to another embodiment, a method of installing a bushing into an anchor end of a brake shoe can comprise supporting an edge of a table portion of the brake shoe on a substantially flat surface with first and second web portions of the brake shoe oriented substantially parallel to the flat surface; supporting a brake support tool on the flat surface; locating the first and second web portions of the brake shoe on first and second support surfaces of the bushing installation tool; and pressing the bushing into an anchor aperture located in the anchor end of the brake shoe.

BRIEF DESCRIPTION OF THE DRAWINGS

The foregoing and other features and advantages of the invention will be apparent from the following drawings wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. However, the invention is not intended to be limited to the specific terminology so selected. A person skilled in the relevant art will recognize that other equivalent parts can be employed and other methods developed without departing from the spirit and scope of the invention.

Figure 1A:
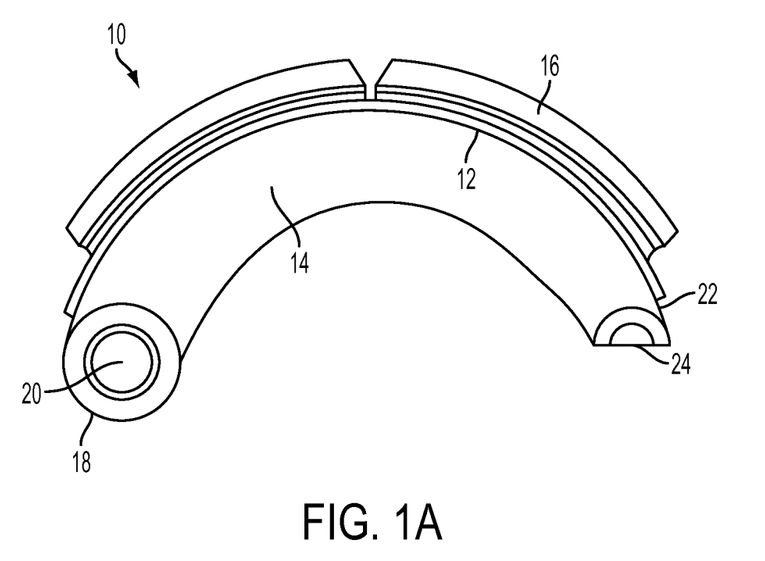
FIGS. 1A and 1B depict illustrative brake shoe configurations that can be used with embodiments of brake tools and methods.
Figure 1B:
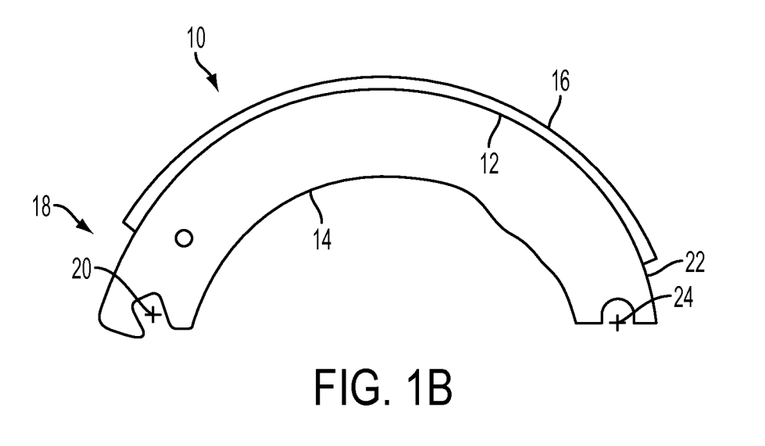

FIGS. 1A and 1B depict brake shoes that can be used with the brake tools and methods of the present invention. FIG. 1A depicts a Meritor® "W" Series brake shoe from Meritor Heavy Vehicle Systems, LLC of Troy, Mich. Generally, the brake shoe 10 includes a core made up of a table portion 12 and a web portion 14. A brake lining 16 is located on the table portion. The web portion 14 includes an anchor end 18 defining an anchor aperture 20, as well as a cam end 22 defining a cam aperture 24. According to the illustrative brake shoe 10 shown in FIG. 1A, the anchor aperture 20 is a bore through the anchor end 18 of the web portion 14, and the cam aperture 24 is a semi-cylindrical groove in the cam end 22 of the web portion 14, however, other brake shoes may have different configurations, such as an aperture at both ends 18, 22, or a groove at both ends 18, 22.

FIG. 1B depicts a Meritor® "Q" series brake shoe, also from Meritor Heavy Vehicle Systems. For purposes of this description, the brake shoe 10 of FIG. 1B is similar to that of FIG. 1A. One of ordinary skill in the art will appreciate that the brake tools and methods of the present invention are not confined to use with the brake shoes 10 shown in FIGS. 1A and 1B, and can be dimensioned and configured for use with other types and sizes of brake shoes, including, for example, model 4656 and 4657 brake shoes from MAN Truck & Bus Aktiengesellschaft, Vogelweiherstrasse 33, D-90441 Nuremberg, Germany.

Along these lines, sets of multiple brake tools according to the present invention may be provided for use with multiple different brake shoes. For example, different brake tools in the set may have dimensions that match the manufacturer's specified dimensions for a variety of corresponding brake shoes. As used herein, and to facilitate description of the invention, the term "corresponding brake shoe" refers to one or more brake shoes that a particular brake tool is configured and dimensioned to inspect.

Figure 2A:
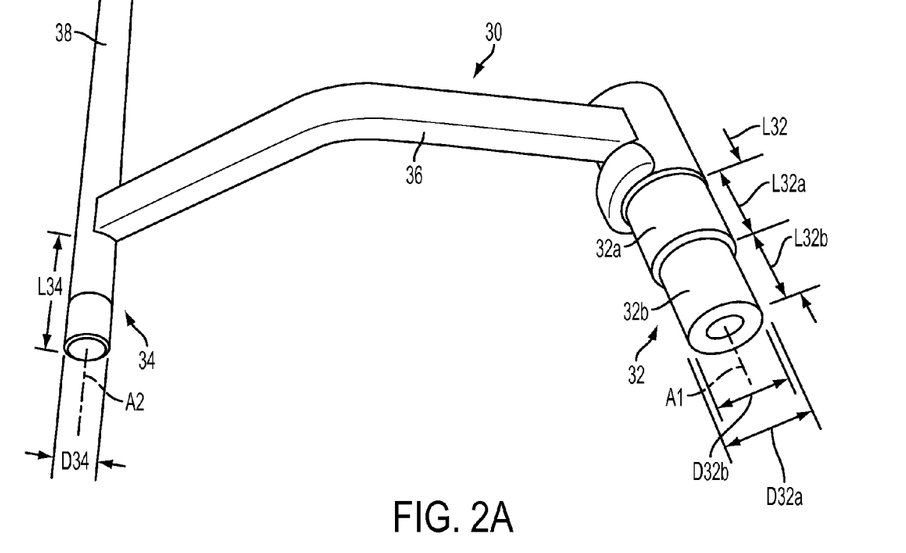
FIG. 2A depicts a first embodiment of a brake tool.
Figure 2B:
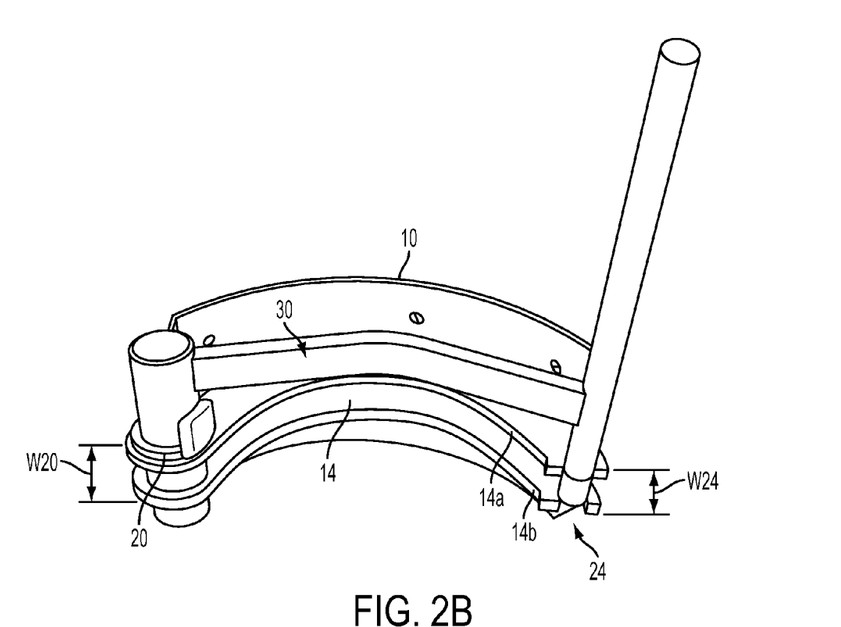
FIG. 2B depicts the brake tool of FIG. 2A being used on a brake shoe.

FIG. 2A depicts a first embodiment of a brake tool 30. FIG. 2B depicts the brake tool 30 being used to inspect a brake shoe 10, which is the Meritor "W" Series brake shoe of FIG. 1A. Generally, the brake tool 30 can be used as a "go-no-go tool" for inspecting the brake shoe 10. As used herein, generally, a go-no-go-tool refers to a measuring tool that does not return a size of the item being measured, but rather, returns a state of the item being measured, e.g., within tolerance and acceptable, or outside tolerance and unacceptable.

According to an embodiment, the brake tool 30 can be used to measure the brake shoe 10 for excessive stretch, e.g., to check if the distance between the anchor aperture 20 and the cam aperture 24 (see FIGS. 1A and 1B) meets the manufacturer's specifications. In addition, the brake tool 30 can be used to check if the anchor aperture 20 and the cam aperture 24 have been shifted or twisted out of alignment with one another. Further, the brake tool 30 can be used to measure for proper size of the anchor aperture 20 and/or cam aperture 24. Although the brake tool 30 shown in FIG. 2A is specifically designed for use with the Meritor® "W" Series brake shoes, it can alternatively be used, or have its dimensions modified for use, with other brake shoes known in the art, such as a Meritor "Q" Series brake shoe, a Meritor® "Cast Plus" Series brake shoe, or a MAN Axle brake shoe, as will be appreciated by one of ordinary skill in the art considering this description.

As shown in FIG. 2A, the brake tool 30 can generally include a first portion 32, a second portion 34, and a connecting member 36 that holds the first portion 32 and second portion 34 together at a predetermined distance and alignment. In addition, the brake tool 30 can include a handle 38 to facilitate its use. As shown in FIG. 2B, when the brake tool 30 is used, the user attempts to insert the first portion 32 and the second portion 34 laterally into the brake shoe's anchor aperture 20 and cam aperture 24, respectively, as will be described in more detail below.

According to an illustrative embodiment, the first portion 32 can have a cross-sectional shape that substantially corresponds to the cross-section of the anchor aperture in the corresponding brake shoe. For example, the first portion 32 can be substantially cylindrical in shape, and can define a first portion axis A1. According to an embodiment, the cylindrical first portion 32 can define a diameter that is substantially equal to the manufacturer's specified diameter for the anchor aperture in the corresponding brake shoe. The first portion 32 can be used to determine whether the anchor aperture meets the manufacturer's specification. That is, if the anchor aperture has become enlarged, there will be noticeable play between the first portion 32 of the brake tool and the anchor aperture upon insertion.

The second portion 34 of the brake tool 30 can also have a cross-sectional shape that substantially corresponds to the cross-section of the cam aperture during installation and removal of the bushing. For example, the second portion 34 can be substantially cylindrical in shape, and can define a second portion axis A2. The cylindrical second portion 34 can define a diameter D34 that is substantially equal to the manufacturer's specified diameter for the cam aperture in the corresponding brake shoe. The second portion 34 can be used to determine whether the cam aperture meets the manufacturer's specification. That is, if the cam aperture has become enlarged, there will be noticeable play between the second portion 34 of the brake tool and the cam aperture upon insertion.

According to other embodiments, the first portion 32 and/or second portion 34 of the brake tool 30 may have a shape other than cylindrical, for example, square, rectangular, flat, or other cross-section or shape that substantially matches or interfaces with the shape of the corresponding anchor aperture or cam aperture.

Figure 3:
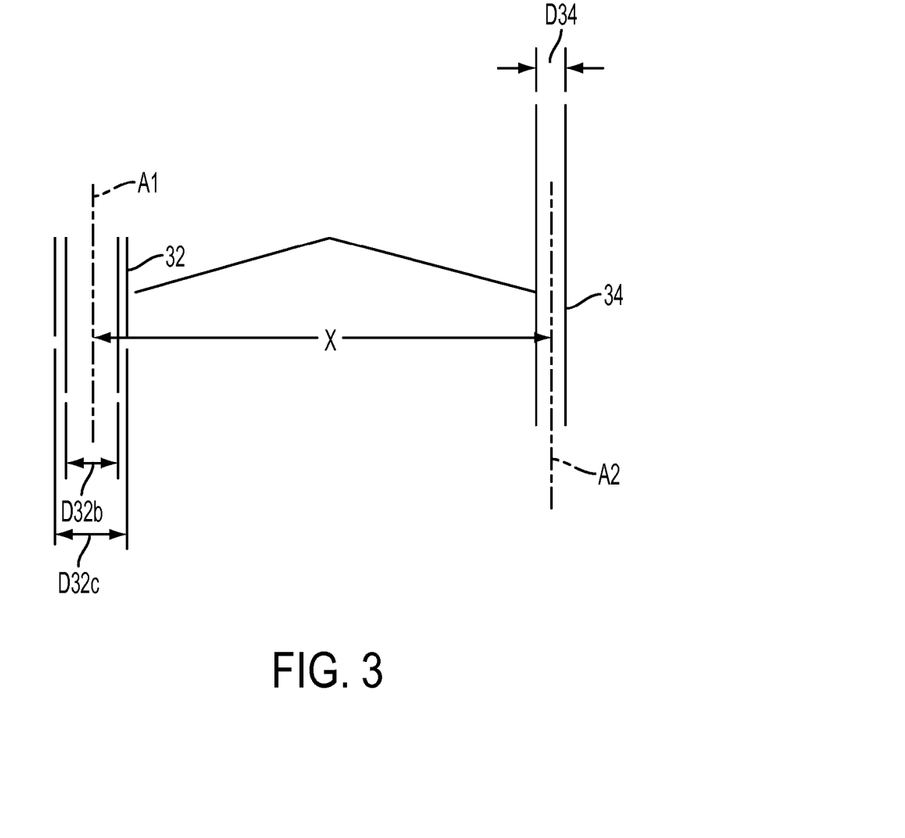
FIG. 3 depicts illustrative dimensions for the brake tool of FIG. 2A.

With reference to FIGS. 2A and 3, the connecting member 36 can support the first portion 32 and second portion 34 in a predefined spatial relationship with respect to one another. For example, the first portion axis A1 and second portion axis A2 can be substantially parallel with one another, for example, to test whether the central axis of the corresponding brake shoe's anchor aperture and the central axis of the cam aperture are substantially parallel to, and aligned with, one another. The first portion axis A1 and the second portion axis A2 can also be spaced apart by a distance X (see FIG. 3) that is substantially equal to the manufacturer's specified distance between the central axis of the anchor aperture and the central axis of the cam aperture of the corresponding brake shoe, e.g., in order to test whether the brake shoe has been stretched.

Some brake shoes may require that a bushing (not shown) be used in the anchor aperture. According to an embodiment of the brake tool 30, the first portion 32 of the brake tool 30 can be configured to test the brake shoe without the bushing installed, as well as with the bushing installed. For example, the first portion 32 can define a first section 32a and a second section 32b having different diameters. For example, the first section 32a can define a first diameter D32a that is substantially equal to the manufacturer's specified inner diameter for the anchor aperture of the corresponding brake shoe. The second section 32b can define a second diameter D32b that is substantially equal to the inner diameter of a bushing located in the anchor aperture of the corresponding brake shoe. As a result, for brake shoes that require a bushing in the anchor aperture, the brake tool 30 can be used to inspect the brake shoe both with and without the bushing in place, potentially resulting in increased accuracy in the inspection process.

The brake tool 30 may be used to test whether the brake shoe has been over torqued, resulting in the central axis of the anchor aperture becoming misaligned with the central axis of the cam aperture. To reliably make this determination, the first portion 32 and the second portion 34 can be designed to engage the entire width, or at least multiple points, of the respective anchor aperture and cam aperture during inspection. For example, referring to FIG. 2B, the anchor aperture 20 may define a width W20, for example, between two spaced apart webs 14a, 14b forming the web portion 14. The cam aperture 24 may also define a width W24, for example, between the two spaced apart webs 14a, 14b. Referring to FIG. 2A, the first portion 32 of the brake tool 30 may define a length L32 along the axis A1 that is substantially equal to or greater than the width W20 of the anchor aperture. Similarly, the second portion 34 of the brake tool 30 may define a length L34 that is substantially equal to or greater than the width W24 of the cam aperture. By having the first portion 32 and second portion 34 engage substantially the entire width, or at least multiple points, of the respective anchor aperture and cam aperture, the tool 30 can more reliably detect twist or misalignment of the brake shoe, e.g., misalignment of the central axes of the anchor aperture and cam aperture. For embodiments where the first portion 32 has multiple sections with different diameters, each section 32a, 32b can have a length L32a, L32b that is substantially equal to or greater than the width W20 of the anchor aperture.

Figure 4A:
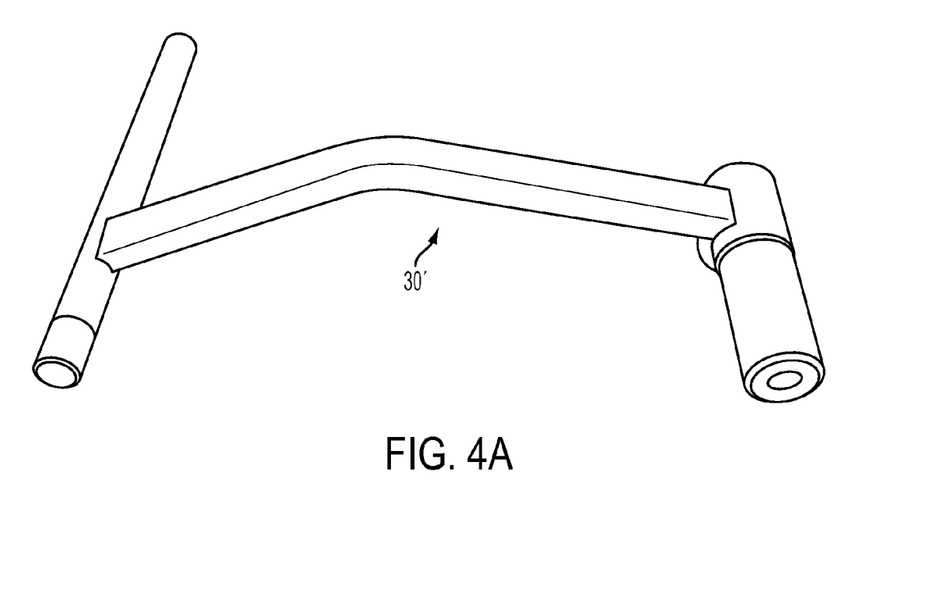
FIG. 4A depicts a second embodiment of a brake tool.
Figure 4B:
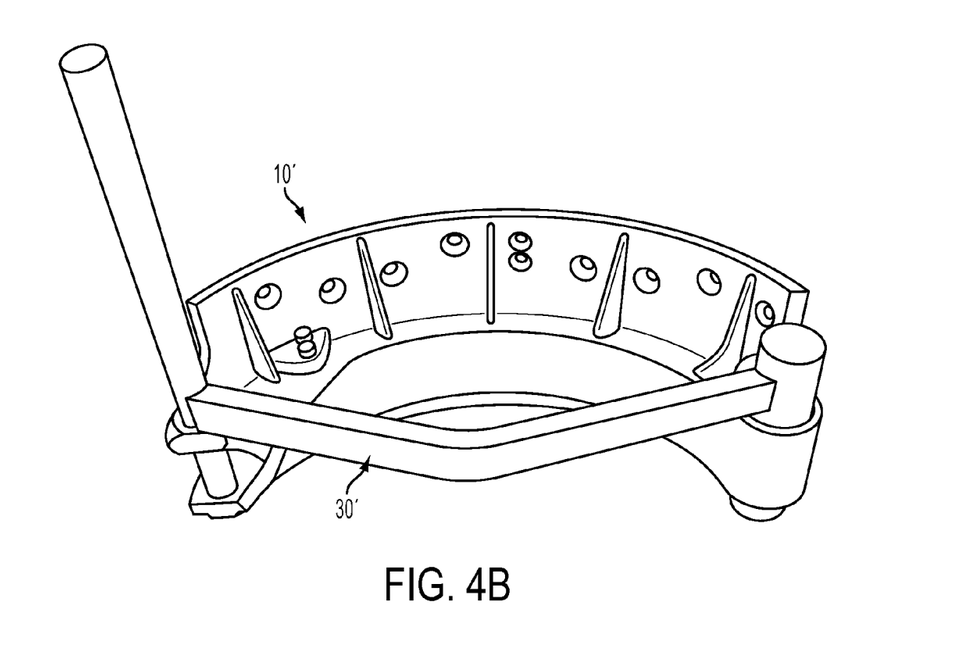
FIG. 4B depicts the brake tool of FIG. 4A being used on a brake shoe.

FIGS. 4A and 4B depict an alternative embodiment of the brake tool 30', which is configured for use with a different brake shoe 10' than shown in FIG. 2B, specifically, a model 4656 or 4657 brake shoe from MAN Truck & Bus Aktiengesellschaft, Vogelweiherstrasse 33, D-90441 Nuremberg, Germany. For purposes of this description, the brake tool 30' is substantially similar to the brake tool 30 described above. Accordingly, FIGS. 4A and 4B will not be described in further detail.

The brake tools 30, 30' can be used to determine whether the corresponding brake shoe has been stretched, misaligned, or twisted. An illustrative method of using the tools will be described in connection with the brake tool 30 and brake shoe 10 of FIGS. 2A and 2B. In use, the operator aligns the first and second portions 32, 34 of the brake tool 30 over the anchor aperture 20 and cam aperture 24, respectively, in the corresponding brake shoe 10. The operator attempts to laterally insert the first and second portions 32, 34 substantially completely into the respective anchor and cam apertures 20, 24. If the first and second portions 32, 34 slide substantially completely into the anchor and cam apertures 20, 24, the operator will know that the brake shoe 10 complies with the manufacturer's specifications. However, if the brake shoe is stretched, misaligned, or twisted beyond acceptable tolerance levels, the second portion 34 will only slide through a portion of the cam aperture 24, or won't enter the cam aperture 24 at all. For example, in the case where the brake shoe's web portion 14 includes first and second webs 14a, 14b, one or both of the webs 14a, 14b will block entry of the second portion 34, indicating that the brake shoe 10 is stretched, misaligned, and/or over torqued beyond tolerance. Alternatively, in the instance of a notched or otherwise open cam aperture, the operator can insert the first portion 32 substantially completely into the anchor aperture 20, and try to rotate the second portion into the cam aperture 24, e.g., around the axis of the first portion. If the brake shoe is stretched, misaligned, or twisted beyond acceptable tolerance levels, the second portion 34 will only fit partially within the cam aperture 24, or won't enter the cam aperture 24 at all. For example, in the case where the brake shoe's web portion 14 includes first and second webs 14a, 14b, one or both of the webs 14a, 14b will block entry of the second portion 34, indicating that the brake shoe 10 is stretched, misaligned, and/or over torqued beyond tolerance. According to an embodiment, the operator can attempt to insert the first and second portions 32, 34 of the brake tool 30 into the corresponding apertures 20, 24 from both sides of the brake shoe 10.

Some brake shoes may have an anchor aperture and/or cam aperture that is not bound on all sides. For example, the anchor aperture and/or cam aperture may comprise a notch or recess, as in the embodiment of FIG. 1B. In this case, the first portion 32 and second portion 34 of the brake tool 30 will be considered to engage the anchor aperture or cam aperture, respectively, when the respective first portion 32 or second portion 34 rests flush with the surface of the respective aperture across substantially the entire width of the aperture. In the case where the anchor aperture 20 or cam aperture 24 comprises grooves or notches in first and second webs 14a, 14b, as with the cam aperture 24 of FIG. 2B, the respective first portion 32 or second portion 34 will be considered to engage the aperture when it rests against the aperture present in both the first web 14a and second web 14b.

According to another aspect, the brake tool 30 can be removed from the apertures in the brake shoe 10, a bushing can be inserted into the anchor aperture 20, and the operator can re-test the brake shoe 10 with the bushing installed. This may be performed in the same manor set forth above.

Figure 5A:
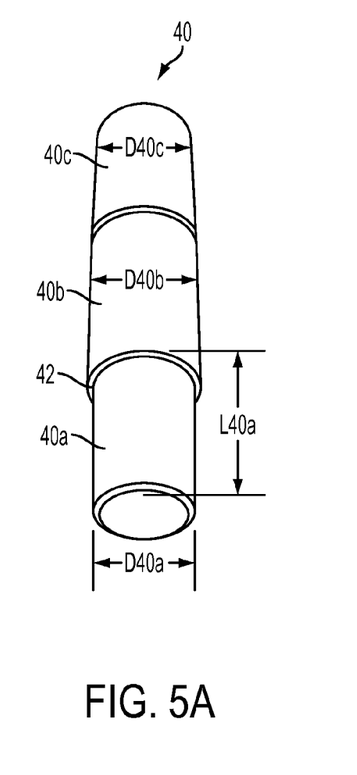
FIG. 5A depicts a first embodiment of a bushing installation tool.
Figure 5B:
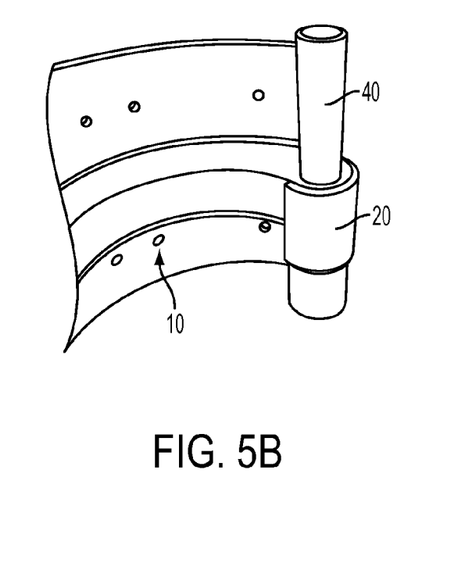
FIG. 5B depicts the bushing installation tool of FIG. 5A being used on a brake shoe.

FIGS. 5A and 5B depict an illustrative bushing installation tool 40 that can be used, for example, to install a bushing into the anchor aperture 20 of a brake shoe 10. Alternatively, the bushing installation tool 40 can be used to install a bushing into another aperture in the brake shoe 10, or to install the bushing into some other part besides a brake shoe. The bushing installation tool 40 can comprise a first section 40a, a second section 40b, and a third section 40c. The first section 40a may be substantially cylindrical and can define a first diameter D40a and first length L40a that are substantially equal to the inner diameter and length, respectively, of the corresponding bushing. Accordingly, the first section 40a can be used to support the bushing by its inner circumference.

The second section 40b can also be substantially cylindrical, and can define a second diameter D40b that is greater than the first diameter D40a. For example, the second diameter D40b can be substantially equal to an outer diameter of the corresponding bushing, although other configurations are possible. The step 42 created at the interface of the first section 40a and second section 40b can support the bushing around one of its edges.

The third section 40c can comprise a stop 40c that prevents the bushing installation tool 40 from being used to press the bushing into the aperture 20 beyond a predetermined depth. This allows the bushing to be pressed into the aperture to the correct depth, as shown in FIG. 5B.

According to an embodiment, the stop 40c can comprise the third portion having a third diameter D40c greater than the second diameter D40b. For example, the stop 40c can be dimensioned to engage with a portion of the brake shoe 10, such as the web 14, to prevent further movement of the bushing installation tool 40 along its axis, and as a result, preventing the first section 40a and bushing from extending into the aperture 20 beyond a predefined depth.

The bushing installation tool 40 can be used to install the bushing into the aperture 20, for example, by mounting the bushing on the first section 40a, locating the bushing over the aperture 20, and pressing the bushing installation tool 40 toward the aperture 20, thereby pressing the bushing into the aperture 20. Once the bushing has reached the appropriate location, the stop 40c engages a portion of the brake shoe 10, such as the web 14 or the table 12, preventing further movement of the bushing installation tool 40, and the bushing located thereon, toward the aperture 20. Accordingly, the proper location of the bushing within the aperture 20 can be achieved.

According to an embodiment, the bushing installation tool 40 can be double ended. According to this embodiment, the two ends can be configured to work with different bushings, e.g., two different bushings having different lengths and/or different diameters.

Figure 6A:
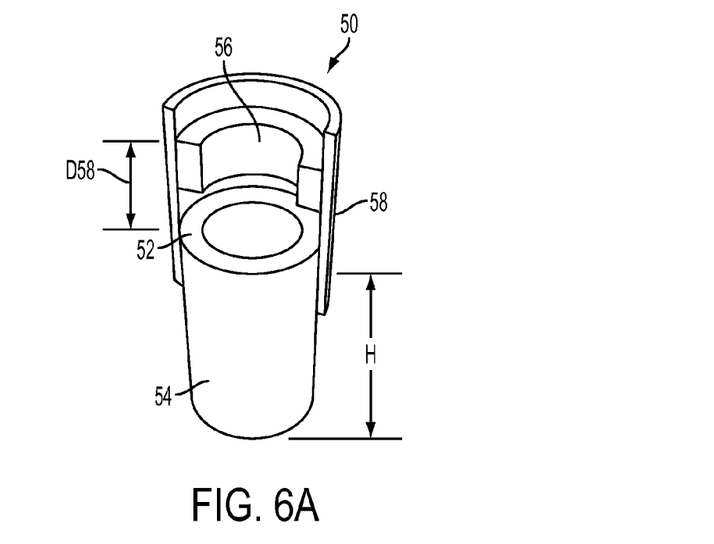
FIG. 6A depicts a first embodiment of a brake support tool.

FIG. 6A depicts an embodiment of brake support tool 50 that can be used to support the brake shoe 10 during bushing installation. FIG. 6A depicts the brake support tool 50 supporting the brake shoe 10. The brake support tool can support the web portion 14 of the brake shoe 10 during installation and/or removal of the anchor bushing, for example, to prevent deformation of the web portion 14 due to the forces created when pressing the bushing into the anchor aperture 20.

Referring to the embodiment shown in FIG. 6A, the brake support tool 50 can include a first support surface 52, which may be substantially ring-shaped, although other shapes are possible. The first support surface 52 can be configured to support the anchor end of the brake shoe by the outer surface of the first web 14a. The first support surface 52 may be defined by the ring-shaped end of a support body 54, which according to an embodiment, may be substantially cylindrical. The support body 54 may support the first support surface 52 at a height substantially equal to the distance between an edge 12a of the brake shoe's table 12, and the outer surface of the first web 14a. Accordingly, when the edge 12a is rested on a flat surface, the brake support tool 50 can also rest on the flat surface, and have the first support surface 52 support the anchor end of the brake shoe 10 and first web 14a substantially parallel to the flat surface. Thus, the first support surface 52 can stabilize the brake shoe 10 during installation and/or removal of the anchor bushing into the anchor aperture 20.

The brake support tool 50 can also include a second support surface 56 that supports the inner surface of the second web 14b. The second support surface 56 may be partially ring-shaped, however, other configurations are possible. The second support surface 56 may be connected to the first support surface 52 by a spacer 58, or alternatively, may be integral with the first support surface 52. According to an embodiment, the spacer 58 can locate the second support surface 56 at an axial distance D58 from the first support surface 52 that is substantially equal to the manufacturer's specified distance between the first web 14a and the second web 14b at the anchor end of the corresponding brake shoe 10. As a result, the second support surface 56 can prevent the second web 14b from being crushed down toward the first web 14a under the forces created when pressing the bushing into the anchor aperture 20. The upper edge of the spacer 58 can be configured to measure the distance between the outer surface of the first web 14a and the outer surface of the second web 14b. The brake support tool 50 can also be used to support the anchor end of the brake shoe 10 during removal of the bushing.

Figure 7A:
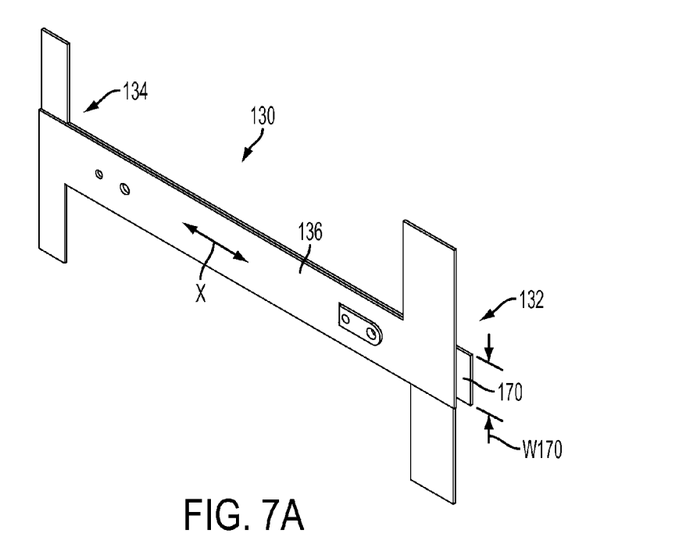
FIGS. 7A-7C depict illustrative perspective, front, and side views of a third embodiment of a brake tool.
Figure 7B:
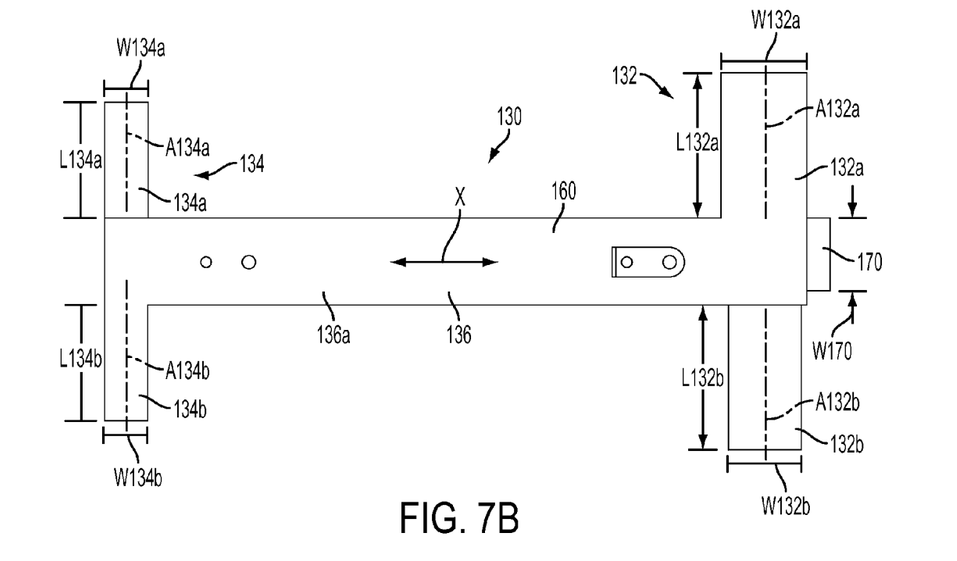
Figure 7C:
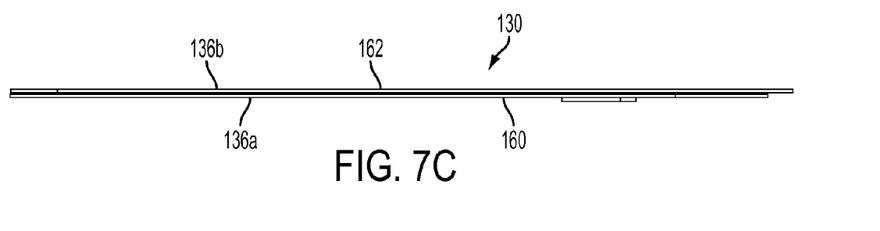

Referring to FIGS. 7A-7C, a second embodiment of a brake tool 130 is shown. Similar to brake tool 30 shown in FIGS. 2A and 2B, brake tool 130 can be used to measure a brake shoe for excessive stretch, e.g., to check if the distance between the anchor aperture 20 and the cam aperture 24 (see FIGS. 1A and 1B) meets the manufacturer's specifications. In addition, the brake tool 130 can be used to check if the anchor aperture 20 and the cam aperture 24 have been shifted or twisted out of alignment with one another. Further, the brake tool 130 can be used to measure for proper size of the anchor aperture 20 and/or cam aperture 24. The brake tool 130 can be used with, or have its dimensions modified for use with, various brake shoes known in the art, such as, for example, Meritor® "W" Series brake shoes, Meritor "Q" Series brake shoes, Meritor® "Cast Plus" Series brake shoes, or a MAN Axle brake shoes, as will be appreciated by one of ordinary skill in the art considering this description.

Brake tool 130 generally includes a first portion 132 that can be used to engage the anchor aperture of the brake shoe, and a second portion 134 that can be used to engage the cam aperture of the brake shoe. The first portion 132 and second portion 134 can be connected by a connecting member 136. When the brake tool 130 is used, the user attempts to insert one side of the first portion 132 and the second portion 134 laterally into the brake shoe's anchor aperture and cam aperture, respectively, as with the embodiment shown in FIG. 2A.

According to an embodiment, the first portion 132 can include a first anchor section 132a that defines a central axis A132a and has a width W132a that is substantially equal to the manufacturer's specified diameter of the corresponding anchor aperture, e.g., without a bushing installed. The second portion 134 can include a first cam section 134a, or cam "go-no-go" section located on the same side of the connecting member 136 as the first anchor section 132a, that defines a central axis A134a, and defines a width W134a that is substantially equal to the manufacturer's specified diameter of the corresponding cam aperture. The first anchor section 132a can define a length L132a along the central axis 132a that is sufficient to engage substantially the entire width of the corresponding anchor aperture (e.g., is substantially equal to or greater than the entire width of the anchor aperture). The first cam section 134a can likewise define a length L134a along the central axis 134a that is sufficient to engage substantially the entire width of the corresponding cam aperture (e.g., is substantially equal to or greater than the entire width of the cam aperture).

According to an embodiment, the first anchor section 132a and first cam section 134a can be used together to measure a brake shoe with no bushing in the anchor aperture. To provide for measuring the brake shoe with a bushing installed in the anchor aperture, the brake tool 130 can include a second anchor section 132b and a second cam section 134b, or cam "go-no-go" that can be used to measure the brake shoe with the bushing installed. For example, the first portion 132 can include a second anchor section 132b, and the second portion 134 can include a second cam section 134b, both located on the same side of the connecting member 136. The second anchor section 132b can define a width W132b that is substantially equal to the inner diameter of the bushing used in the anchor aperture. The second cam section 134b can define a width W134b that is substantially equal to the manufacturer's specified diameter of the corresponding cam aperture, e.g., equal to width W134a. Accordingly, for brake shoes that require a bushing in the anchor aperture, the brake tool 130 can be used to inspect the brake shoe both with and without the bushing in place, potentially resulting in increased accuracy in the inspection process.

Still referring to FIG. 7B, the second anchor section 132b can define a length L132b along the central axis A132b that is sufficient to engage substantially the entire width of the corresponding anchor aperture (e.g., is substantially equal to or greater than the entire width of the anchor aperture). The second cam section 134b can likewise define a length L134b along the central axis A134b that is sufficient to engage substantially the entire width of the corresponding cam aperture (e.g., is substantially equal to or greater than the entire width of the cam aperture).

According to an embodiment, the brake tool 130 can be substantially flat. For example, as shown in FIG. 7C, the brake tool 130 can comprise a first member 160, or plate, that forms the first anchor section 132a, a first portion 136a of the connecting member 136, and the second cam section 134b. According to an embodiment, the first member 160 can comprise a flat metal plate, such as, for example, ⅛" stainless steel. The brake tool 130 can further comprise a second member 162, or plate, similar in construction to the first member 160, that forms the second anchor section 132b, a second portion 136b of the connecting member 136, and the first cam section 134a.

The first member 160 and second member 162 can be joined together in a manner that allows the first anchor section 132a to move with respect to the first cam section 134a, and allows the second anchor section 132b to move with respect to the second cam section 134b, for example, along the axis X shown in FIGS. 7A and 7B. According to an embodiment, the amount of movement along axis X can correspond to the manufacturer's specified tolerance in the distance between the anchor aperture and the cam aperture, which in some instances, may be 60 thousandths of an inch, however, other amounts of movement along the X direction are also possible. To provide for the relative movement between the first member 160 and the second member 162 along axis X, the two components may be secured to one another via an elongated slot in one member, and one or more fasteners extending from the other member through the slot, however, other structures are possible. According to an embodiment, the length of the slot in the direction X may correspond to the manufacturer's specified tolerance.

Referring to FIGS. 7A, 7B, the brake tool 130 may include a bushing measurement gauge 170, also known as a bushing "go-no-go" supported by the connecting member 136, e.g., formed by one of the plates 160, 162. The bushing measurement gauge 170 can extend substantially transversely to the first and second portions 132, 134, and can define a width W170 that is substantially equal to the inner diameter of the bushing used in the anchor aperture (e.g., substantially equal to W132b). In the embodiment shown in FIGS. 7A-7C, the bushing measurement gauge 170 has an unencumbered location that permits insertion of the gauge 170 into the inner diameter of the bushing, and permits rotation of the gauge 170 by 360 degrees, for example, to ensure that the bushing has the proper diameter around its entire inner circumference.

In use, the operator aligns the first anchor section 132a and first cam section 134a of the brake tool 130 over the anchor aperture 20 and cam aperture 24, respectively, in the corresponding brake shoe. The operator attempts to laterally insert the first anchor section 132a and first cam section 134a substantially completely into the respective anchor and cam apertures 20, 24. If they slide substantially completely into the anchor and cam apertures 20, 24, the operator will know that the brake shoe 10 complies with the manufacturer's specifications. However, if the brake shoe is stretched, misaligned, or twisted, the first cam section 134a will only slide through a portion of the cam aperture 24, or won't enter the cam aperture 24 at all. For example, in the case where the brake shoe's web portion 14 includes first and second webs 14a, 14b, one or both of the webs 14a, 14b will block entry of the first cam section 134a, indicating that the brake shoe is stretched, misaligned, and/or over torqued. Alternatively, in the instance of a notched or otherwise open cam aperture, the operator can insert the first anchor section 132a substantially completely into the anchor aperture 20, and try to rotate the first cam section 134a into the cam aperture 24, e.g., around the axis of the first anchor section A132a. If the brake shoe is stretched, misaligned, or twisted beyond acceptable tolerance levels, the first cam section 134a will only fit partially within the cam aperture 24, or won't enter the cam aperture 24 at all. Since the brake tool 130 allows movement (e.g., corresponding to a manufacturer's specified tolerance) between the first portion 132 and the second portion 134 along the X axis, these two parts may move slightly with respect to one another in order to fit into the anchor aperture 20 and cam aperture 24 (e.g., to account for the manufacturer's specified tolerance for the brake shoe).

According to another aspect, the brake tool 130 can be removed from the apertures in the brake shoe, a bushing can be inserted into the anchor aperture 20, and the operator can re-test the brake shoe 10 with the bushing installed. This may be performed in the same manor set forth above, but by using the second anchor section 132b and the second cam section 134b instead of the first anchor section 132a and the first cam section 134a.

Figure 8A:
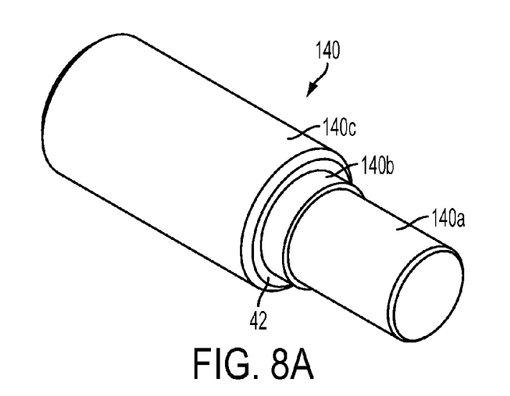
FIGS. 8A, 8B, and 8C depict illustrative perspective, side, and front views of a second embodiment of a bushing installation tool.
Figure 8B:
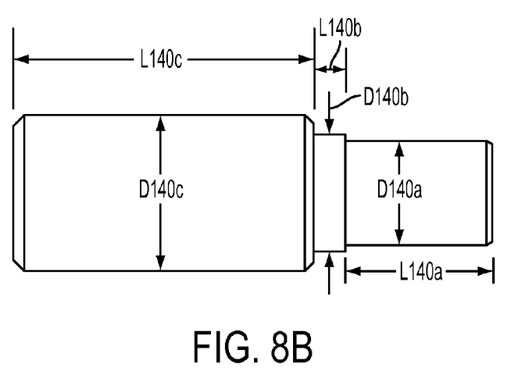
Figure 8C:
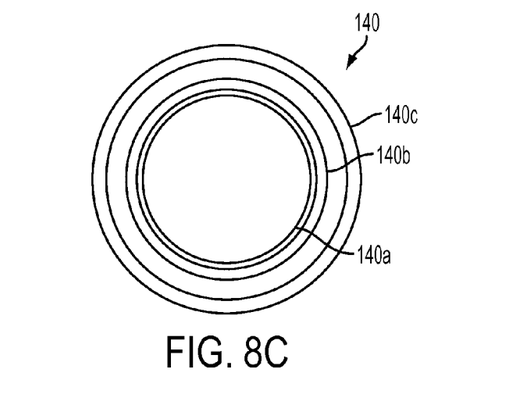

Referring to FIGS. 8A-8C, a second embodiment of a bushing installation tool is shown. The bushing installation tool 140 of FIGS. 8A-8C is substantially similar in structure and operation to the embodiment shown and described in connection with FIGS. 5A and 5B. Accordingly, further description will not be provided.

With reference to FIG. 8B, listed below are some exemplary dimensions that may be suitable for use with known brake shoes. All dimensions are listed as inches.

| BRAKE SHOE | L140a | L140b | L140c | D140a | D140b | D140c |
|---|---|---|---|---|---|---|
| Mann Axel (short bushing) | 1.650 | 0.355 | 3.370 | 1.170 | 1.312 | 1.750 |
| Mann Axel (long bushing) | 1.825 | 0.268 | 3.282 | 1.312 | 1.170 | 1.750 |
| Meritor W Type 1, 3 | 2.125 | 0.210 | 3.790 | 1.230 | 1.480 | 1.750 |

Figure 9A:
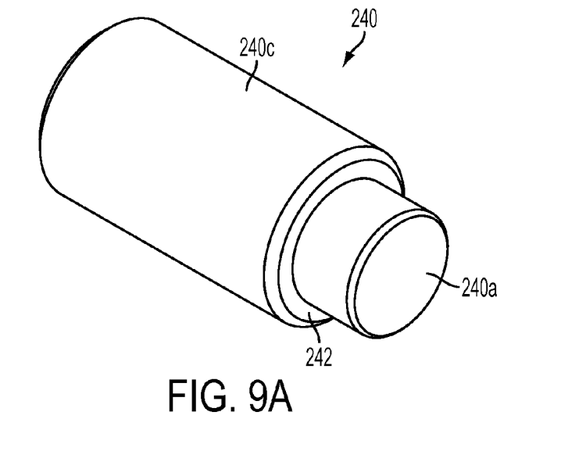
FIGS. 9A, 9B, and 9C depict illustrative perspective, side, and front views of a third embodiment of a bushing installation tool.
Figure 9B:
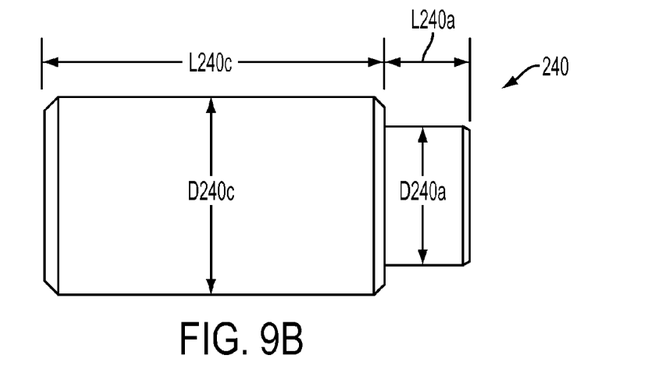
Figure 9C:
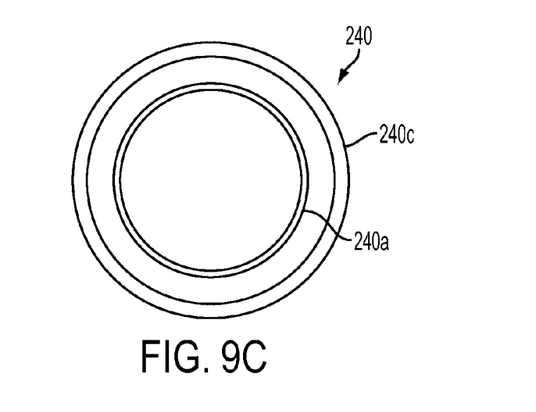
Figure 10A:
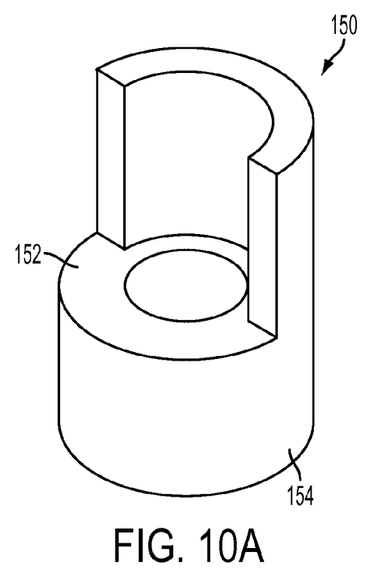
FIGS. 10A, 10B, 10C, and 10D depict illustrative perspective, side, front, and top views of a second embodiment of a brake support tool.
Figure 10B:
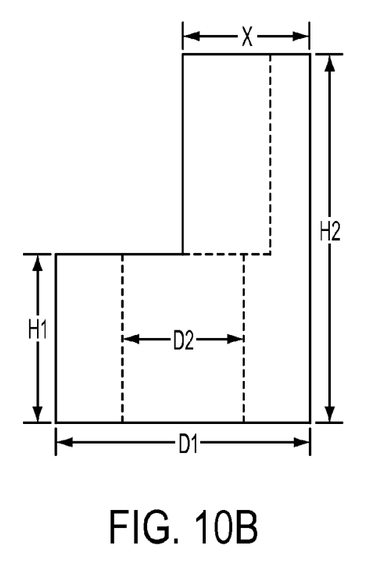
Figure 10C:
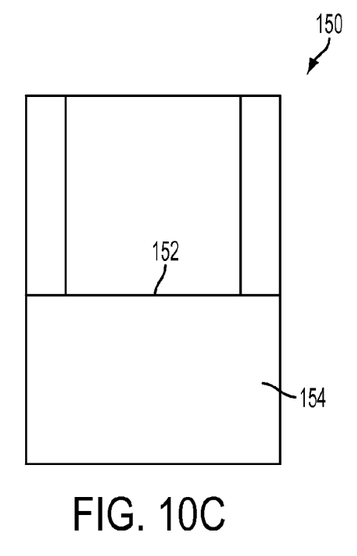
Figure 10D:
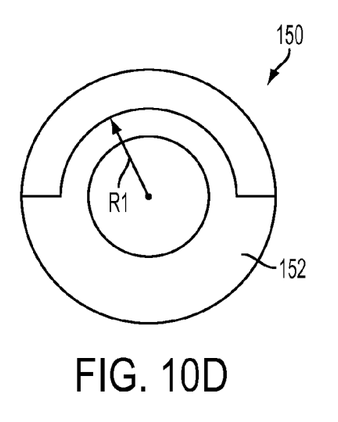
Figure 11A:
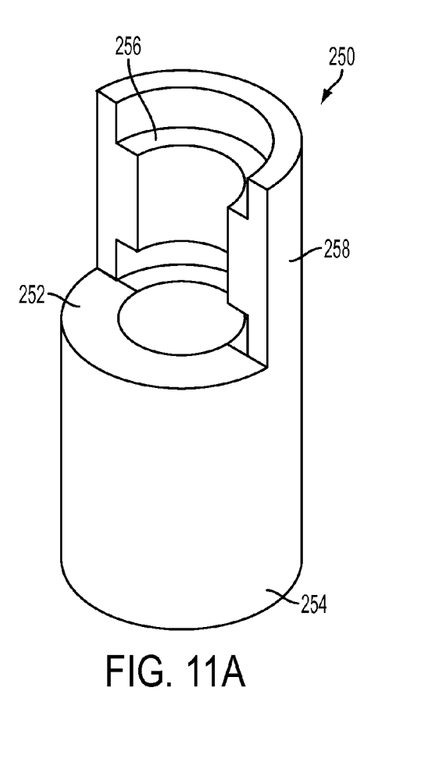
FIGS. 11A, 11B, 11C, and 11D depict illustrative perspective, side, front, and top views of a third embodiment of a brake support tool.
Figure 11B:
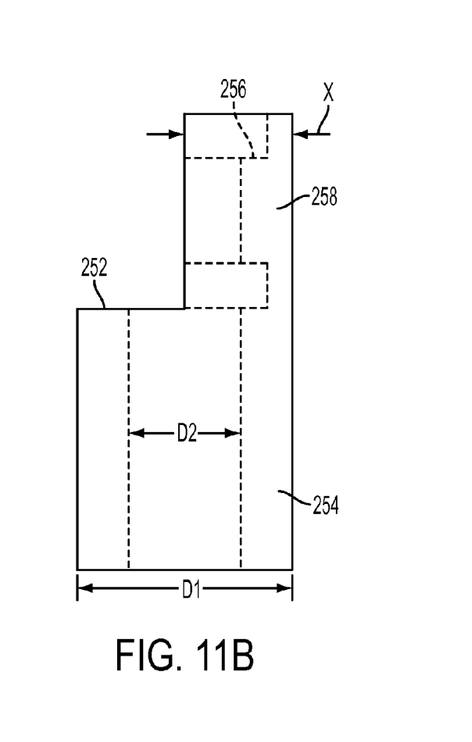
Figure 11C:
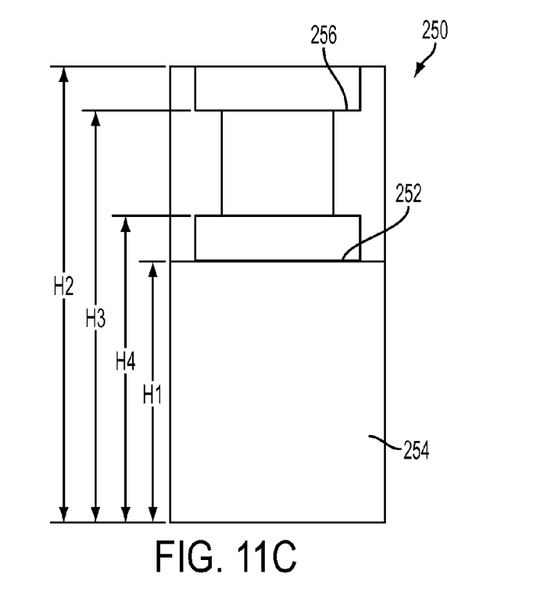
Figure 11D:
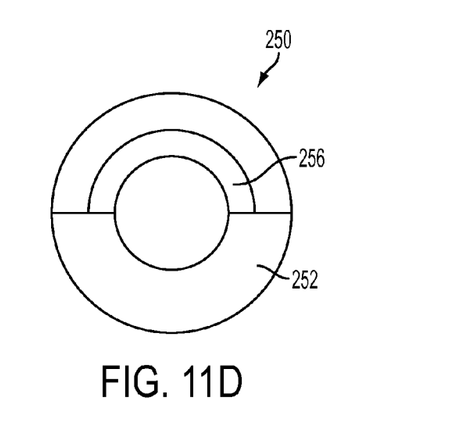

Referring to FIGS. 9A-9C, a third embodiment of a bushing installation tool is shown. The bushing installation tool 240 of FIGS. 9A-9C is substantially similar in structure and operation to the embodiment shown and described in connection with FIGS. 5A and 5B, except it omits the second section 40b (see FIG. 5A). Accordingly, further description will not be provided.

With reference to FIG. 9B, listed below are some exemplary dimensions that may be suitable for use with known brake shoes. All dimensions are listed as inches.

| BRAKE SHOE | L240a | L240c | D240a | D240c |
|---|---|---|---|---|
| Meritor Cast Plus | 0.750 | 3.000 | 1.230 | 1.750 |

Figure 6B:
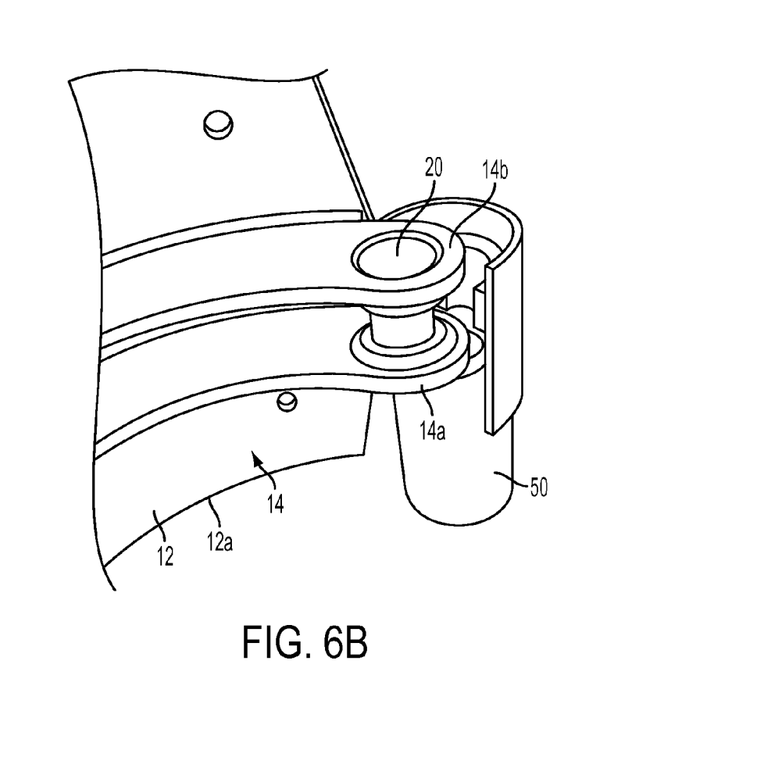
FIG. 6B depicts the brake support tool of FIG. 6A being used on a brake shoe.

FIGS. 10A-10D depict a second embodiment of a brake support tool 150, similar to that shown and described in connection with FIGS. 6A and 6B, except that it omits the second support surface 56, which may be used to support the inner surface of a second web 14b, for example, at the cam end of a brake shoe. The brake support tool 150 may be used, for example, to support a solid end of a brake shoe. With reference to FIGS. 10A-10D, listed below are some exemplary dimensions that may be suitable for use with known brake shoes. All dimensions are listed as inches.

| BRAKE SHOE | H1 | H2 | X | D1 | D2 | R1 |
|---|---|---|---|---|---|---|
| Mann Axel 6.5 Wide | 1.990 | 4.350 | 1.500 | 3.00 | 1.436 | 1.032 |
| Mann Axel 8.75 Wide | 3.150 | 5.500 | 1.500 | 3.00 | 1.436 | 1.032 |

FIGS. 11A-11D depict a third embodiment of a brake support tool 250, substantially similar is structure and operation to the brake support tool 50 shown and described in connection with FIGS. 6A and 6B. With reference to FIGS. 11A-11D, listed below are some exemplary dimensions that may be suitable for use with known brake shoes. All dimensions are listed as inches.

| BRAKE SHOE | H1 | H2 | H3 | H4 | X | D1 | D2 |
|---|---|---|---|---|---|---|---|
| Meritor W Type 2 | 3.660 | 6.375 | 5.760 | 4.285 | 1.500 | 3.000 | 1.562 |
| Meritor W Rear | 1.950 | 3.895 | 3.320 | 2.570 | 1.500 | 3.000 | 1.600 |
| Meritor W Type 1, 3 | 3.875 | 6.000 | 5.375 | 4.500 | 1.500 | 3.000 | 1.600 |
| Meritor Cast Plus | 2.830 | 5.812 | 5.062 | 3.582 | 1.500 | 3.000 | 1.500 |
| Meritor AY Support | 1.570 | 4.550 | 3.800 | 2.320 | 1.500 | 3.000 | 1.436 |

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A brake tool for inspecting a brake shoe having an anchor end and a cam end, the tool comprising:
    a first portion adapted to engage with an anchor aperture in the anchor end of the brake shoe, the first portion defining a first portion axis and having a length along the first portion axis sufficient to engage substantially an entire width of the anchor aperture;
    a second portion adapted to engage with a cam aperture in the cam end of the brake shoe, the second portion defining a second portion axis and having a length along the second portion axis sufficient to engage substantially an entire width of the cam aperture; and
    a connecting member connecting the first portion and the second portion with the first portion axis and the second portion axis substantially parallel to one another,
    wherein the first portion is adapted to move with respect to the second portion in a direction substantially perpendicular to the first portion axis by a predetermined tolerance distance; and
    wherein the connecting member comprises a first member connected to the first portion and a second member connected to the second portion, wherein the second member is slidably mounted to the first member.

2. The brake tool of claim 1, wherein the first portion defines a length along the first portion axis that is substantially equal to or greater than the entire width of the anchor aperture.

3. The brake tool of claim 1, wherein the second portion defines a length along the second portion axis that is substantially equal to or greater than the entire width of the cam aperture.

4. The brake tool of claim 1, wherein the second portion is substantially cylindrical and defines a diameter substantially equal to a predetermined diameter for the cam aperture.

5. The brake tool of claim 1, wherein the anchor aperture comprises a bore, a notch, or a groove.

6. The brake tool of claim 1, wherein the cam aperture comprises a bore, a notch, or a groove.

7. The brake tool of claim 1, wherein the anchor aperture defines a central anchor aperture axis and the cam aperture defines a central cam aperture axis spaced apart by a predetermined distance, and the first portion axis and the second portion axis are spaced apart by the predetermined distance.

8. The brake tool of claim 7, wherein the predetermined distance is substantially equal to a manufacturer's specified distance between the central anchor aperture axis and the central cam aperture axis.

9. The brake tool of claim 1, wherein the first portion includes a first substantially cylindrical section defining a first diameter substantially equal to a predetermined diameter for the anchor aperture.

10. The brake tool of claim 9, wherein the first portion includes a second substantially cylindrical section defining a second diameter less than the predetermined diameter for the anchor aperture.

11. The brake tool of claim 1, wherein the first member comprises a first plate defining the first portion, the second member comprises a second plate defining the second portion, and the first plate overlays the second plate.

12. The brake tool of claim 11, wherein the first plate is connected to the second plate by a fastener in one of the first plate and the second plate extending through an elongated slot in the other of the first plate and the second plate.

13. A brake tool for inspecting a brake shoe having an anchor end and a cam end, the tool comprising:
    a first portion adapted to engage with an anchor aperture in the anchor end of the brake shoe, the first portion defining a first portion axis and having a length along the first portion axis sufficient to engage substantially an entire width of the anchor aperture;
    a second portion adapted to engage with a cam aperture in the cam end of the brake shoe, the second portion defining a second portion axis and having a length along the second portion axis sufficient to engage substantially an entire width of the cam aperture; and a connecting member connecting the first portion and the second portion with the first portion axis and the second portion axis substantiall sarallel to one another;

wherein the first portion includes a first anchor section that is substantially flat and defines a first anchor section width substantially equal to a predetermined diameter for the anchor aperture, and the second portion includes a first cam section that is substantially flat and defines a first cam section width substantially equal to a predetermined diameter for the cam aperture.

14. The brake tool of claim 13, wherein the first anchor section width is substantially equal to a manufacturer's specified diameter for the anchor aperture.

15. The brake tool of claim 13, wherein the first portion includes a second anchor section that is substantially flat and defines a second anchor section width less than the first anchor section width, and the second portion includes a second cam section that is substantially flat and defines a second cam section width substantially equal to the first cam section width.

16. The brake tool of claim 15, wherein the first anchor section and the second anchor section are located on opposite sides of the connecting member.

17. The brake tool of claim 15, further comprising a bushing measurement gauge located on the connecting member substantially perpendicular to the first portion axis, wherein the bushing measurement gauge is flat and defines a width substantially equal to the second anchor section width.

18. The brake tool of claim 15, wherein the second anchor section width is substantially equal to an inner diameter of a bushing located within the anchor aperture.

* * * * *

UNITED STATES PATENT AND TRADEMARK OFFICE
CERTIFICATE OF CORRECTION

PATENT NO. : 8,915,128 B2  
APPLICATION NO. : 13/369802  
DATED : December 23, 2014  
INVENTOR(S) : Lawrence W. Tucker

Page 1 of 1

It is certified that error appears in the above-identified patent and that said Letters Patent is hereby corrected as shown below:

In the Claims:

At column 13, claim number 13, line number 3, delete "sarallel" and replace with --parallel--.

Signed and Sealed this  
Twelfth Day of May, 2015

Michelle K. Lee  
*Director of the United States Patent and Trademark Office*